US008849524B2

(12) United States Patent
Hattori et al.

(10) Patent No.: US 8,849,524 B2
(45) Date of Patent: Sep. 30, 2014

(54) VEHICULAR SHIFT CONTROL APPARATUS

(71) Applicants: Kunio Hattori, Toyota (JP); Shinya Toyoda, Nisshin (JP); Taira Iraha, Okazaki (JP)

(72) Inventors: Kunio Hattori, Toyota (JP); Shinya Toyoda, Nisshin (JP); Taira Iraha, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 36 days.

(21) Appl. No.: 13/683,547

(22) Filed: Nov. 21, 2012

(65) Prior Publication Data

US 2013/0080004 A1   Mar. 28, 2013

Related U.S. Application Data

(63) Continuation-in-part of application No. PCT/JP2010/058677, filed on May 21, 2010.

(51) Int. Cl.
  *G06F 7/00* (2006.01)
  *F16H 61/00* (2006.01)
  *F16H 61/662* (2006.01)

(52) U.S. Cl.
  CPC .............. *F16H 61/662* (2013.01); *F16H 61/00* (2013.01); *F16H 61/66272* (2013.01)
  USPC .................................. 701/51; 701/58; 477/46

(58) Field of Classification Search
  CPC ............ F16H 61/061; F16H 61/66259; F16H 61/66272; F16H 63/502; B60W 30/19
  USPC ............. 701/51, 58, 60, 61; 180/366; 477/39, 477/45, 46, 174; 474/28
  See application file for complete search history.

(56) References Cited

U.S. PATENT DOCUMENTS

| 2004/0176212 A1* | 9/2004 | Leising et al. ................... 477/39 |
| 2005/0107195 A1* | 5/2005 | Katou ............................. 474/28 |

FOREIGN PATENT DOCUMENTS

| JP | 2005-299803 | 10/2005 |
| JP | 2007-057073 | 3/2007 |
| JP | 2007-162919 | 6/2007 |

\* cited by examiner

*Primary Examiner* — Thomas Tarcza
*Assistant Examiner* — Kevin Myhre
(74) *Attorney, Agent, or Firm* — Oblon, Spivak, McClelland, Maier & Neustadt, L.L.P.

(57) ABSTRACT

A vehicular shift control apparatus configured to control a speed ratio of a belt-type transmission having first and second variable-diameter pulleys, and a transmission belt wound between the first and second variable-diameter pulleys, by controlling hydraulic pressures to be applied to respective hydraulic cylinders of said first and second variable-diameter pulleys, according to respective commanded hydraulic pressure values of the first and second variable-diameter pulleys, such that the speed ratio coincides with a target value, the vehicular shift control apparatus includes a shift control portion configured to be operable, when a first-variable-diameter-pulley hold pressure which permits the speed ratio of said belt-type transmission to be held at the target value in a shift-down action is determined as said commanded hydraulic pressure value of the first variable-diameter pulley, to temporarily reduce said commanded hydraulic pressure value with respect to said first-variable-diameter-pulley hold pressure in an initial period of said shift-down action.

9 Claims, 8 Drawing Sheets

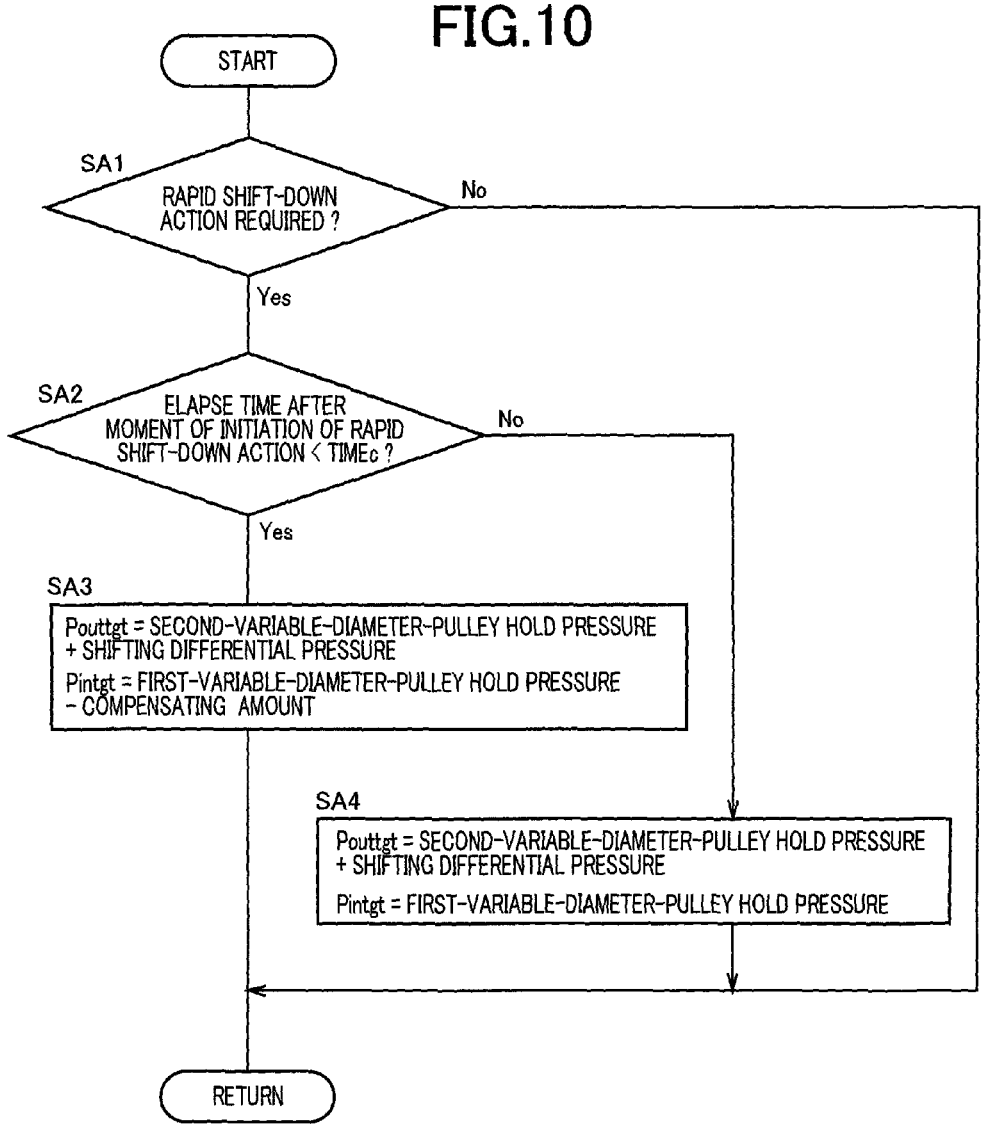

VEHICULAR SHIFT CONTROL APPARATUS

TECHNICAL FIELD

The present invention relates to a hydraulic pressure control relating to shifting actions of a belt-type transmission of a vehicle.

BACKGROUND ART

There is known a vehicular shift control apparatus configured to implement shifting actions of a belt-type transmission having a pair of variable-diameter pulleys and a transmission belt connecting the pair of variable-diameter pulleys, by a hydraulic pressure control to change effective diameters of the above-indicated pair of variable-diameter pulleys (diameters of the pulleys at which the transmission belt engages the pulleys). Patent Document 1 discloses an example of such a shift control apparatus for a belt-type transmission. The shift control apparatus for the belt-type transmission disclosed in this Patent Document 1 is configured such that the regulation valve regulates supply hydraulic pressures to be respectively applied to the pair of variable-diameter pulleys, according to respective commanded hydraulic pressure values, for implementing a shifting action of the belt-type transmission such that a speed ratio of the transmission coincides with a target value, and such that the above-indicated transmission belt does not slip on the above-indicated variable-diameter pulleys. One of the above-indicated pair of variable-diameter pulleys, which is a driving-side variable-diameter pulley, includes a hydraulic cylinder provided to receive the supply hydraulic pressure. The hydraulic cylinder has a working oil supply port provided with a supply-side check valve for inhibiting a discharge flow of the working oil, and a working oil discharge port provided with a discharge-side check valve which is switchable from its working oil discharge inhibiting state to its working oil discharge permitting state, upon an operation of a hydraulic actuator. The shift control apparatus disclosed in the above-described Patent Document 1 operates the above-indicated hydraulic actuator to permit the discharge flow of the working oil from the hydraulic cylinder of the above-indicated driving-side variable-diameter pulley, when a predetermined condition for permitting the discharge flow of the working oil is satisfied.

PRIOR ART DOCUMENTS

Patent Documents

Patent Document 1: JP-2007-162919 A
Patent Document 2: JP-2007-057073 A
Patent Document 3: JP-2005-299803 A

SUMMARY OF THE INVENTION

Object Achieved by the Invention

A conventional vehicular shift control apparatus such as the belt-type transmission shift control apparatus disclosed in the above-identified Patent Document 1 controls the hydraulic pressures of the hydraulic cylinders to be respectively applied to the above-indicated pair of variable-diameter pulleys according to the respective commanded hydraulic pressure values, for changing the speed ratio of the belt-type transmission, that is, uses the hydraulic pressures to implement a shifting control of the belt-type transmission, so that the shifting control may suffer from a low degree of control response of the hydraulic pressures. The control response of the hydraulic pressures tends to be particularly low in an initial period of a rapid shift-down action of the transmission, resulting in an insufficiently high shifting response of the transmission, and giving rise to a risk of failure to achieve a target shifting speed in the initial period of the shift-down action, which meets a specific running state of the vehicle, for instance. In this respect, it is noted that this problem was not known at the time the present invention was made.

The present invention was made in view of the background art described above. It is therefore an object of the present invention to provide a vehicular shift control apparatus which permits a hydraulic control to shift down a belt-type transmission with a sufficiently high shifting response while preventing slipping of its transmission belt.

Means for Achieving the Object

The object indicated above is achieved according to the present invention, which provides (a) a vehicular shift control apparatus configured to control a speed ratio of a belt-type transmission having a first variable-diameter pulley disposed on the side of a drive power source of a vehicle, a second variable-diameter pulley disposed on the side of drive wheels of the vehicle, and a transmission belt wound between the first and second variable-diameter pulleys, by controlling hydraulic pressures to be applied to respective hydraulic cylinders of the above-described first and second variable-diameter pulleys, according to respective commanded hydraulic pressure values of the first and second variable-diameter pulleys, such that the speed ratio coincides with a target value, (b) characterized in that when a first-variable-diameter-pulley hold pressure which permits the speed ratio of the above-described belt-type transmission to be held at the target value in a shift-down action of said belt-type transmission is determined as the above-described commanded hydraulic pressure value of the first variable-diameter pulley, the above-described commanded hydraulic pressure value is temporarily reduced with respect to the above-described first-variable-diameter-pulley hold pressure in an initial period of the above-described shift-down action.

Advantages of the Invention

According to the present invention, the above-indicated first-variable-diameter-pulley commanded hydraulic pressure value is temporarily reduced, so that the hydraulic pressure to be received by a hydraulic cylinder of the above-described first variable-diameter pulley (not the hydraulic pressure within the hydraulic cylinder), namely, the hydraulic pressure to be applied to the hydraulic cylinder (first supply hydraulic pressure) can be reduced immediately after a moment of initiation of the shift-down action, as compared with that before the moment of initiation. Accordingly, working oil can be easily discharged from the above-described first variable-diameter pulley, permitting a sufficiently high degree of shifting response of the belt-type transmission, with efficient decrease and increase of effective diameters of the respective first and second variable-diameter pulleys in the shift-down action, for instance, a rapid shift-down action of the above-described belt-type transmission. In addition, the hydraulic pressure within the hydraulic cylinder of the above-described first variable-diameter pulley is not considerably reduced due to oil flow resistances of a hydraulic control circuit, since the first-variable-diameter-pulley commanded hydraulic pressure value is reduced at the beginning of the shift-down action only temporarily. Accordingly, it is possible to adequately prevent slipping of the transmission belt. It is noted that the above-indicated target value of the speed ratio is a transient target value of the above-described speed ratio during the shift-down action. This transient target value is changed from time to time during the shift-down action, so that the thus changed transient target value approaches the speed ratio value to be established after the shift-down action (a final target speed ratio value). Therefore the first-variable-diameter-pulley hold pressure varies accompanying with the target value of the speed ratio during the shift-down action.

According to a preferred form of the present invention, an orifice is provided in an oil passage between the hydraulic cylinder of the above-described first variable-diameter pulley and a hydraulic pressure control valve configured to regulate a hydraulic pressure to be applied to the hydraulic cylinder of the above-described first variable-diameter pulley. In this preferred form of the invention, the above-described orifice functions to prevent a change of the hydraulic pressure within the hydraulic cylinder of the above-described first variable-diameter pulley, so that slipping of the transmission belt can be more effectively prevented, than in the case where the orifice is not provided.

According to another preferred form of the invention, the above-described commanded hydraulic pressure value of the first variable-diameter pulley is temporarily reduced with respect to the above-described first-variable-diameter-pulley hold pressure in the initial period of the above-described shift-down action, such that an amount of reduction of the above-described commanded hydraulic pressure value of the first variable-diameter pulley with respect to the first-variable-diameter-pulley hold pressure increases with an increase of a target value of a shifting speed. In this preferred form of the invention, the amount of reduction of the above-indicated first supply hydraulic pressure immediately after the moment of initiation of the above-described shift-down action also increases with the increase of the above-indicated target value of the shifting speed, so that the above-described shifting response can be changed according to the target value of the shifting speed.

According to a further preferred form of the invention, the above-described commanded hydraulic pressure value of the first variable-diameter pulley is temporarily reduced with respect to the above-described first-variable-diameter-pulley hold pressure in the initial period of the above-described shift-down action, such that a length of time during which the above-described commanded hydraulic pressure value of the first variable-diameter pulley is temporarily reduced with respect to the first-variable-diameter-pulley hold pressure increases with an increase of a target value of a shifting speed. In this preferred form of the invention, the amount of reduction of the above-indicated first supply hydraulic pressure immediately after the moment of initiation of the above-described shift-clown action also increases with the increase of the above-indicated target value of the shifting speed, so that the above-described shifting response can be changed according to the target value of the shifting speed.

According to a still further preferred form of the invention, a sum of a second-variable-diameter-pulley hold pressure which permits the speed ratio to be held at the above-described target value in the above-described shift-down action, and a shifting differential pressure for establishing a target value of a shifting speed in the shift-down action, is determined as the above-described commanded hydraulic pressure value of the second variable-diameter pulley. In this preferred form of the invention, it is possible to more effectively prevent slipping of the transmission belt, than in the case of the shift-down action where the above-described commanded hydraulic pressure value of the second variable-diameter pulley is held at the above-described second-variable-diameter-pulley hold pressure, while the above-described commanded hydraulic pressure value of the first variable-diameter pulley is reduced with respect to the above-described first-variable-diameter-pulley hold pressure.

According to a yet further preferred form of the invention, the above-described commanded hydraulic pressure value of the first variable-diameter pulley is held at the above-described first-variable-diameter-pulley hold pressure after the commanded hydraulic pressure value of the first variable-diameter pulley is temporarily reduced with respect to the first-variable-diameter-pulley hold pressure in the initial period of the above-described shift-down action. In this preferred form of the invention, the hydraulic pressure control after the commanded hydraulic pressure value of the first variable-diameter pulley is held at the first-variable-diameter-pulley hold pressure can be implemented in the same manner as the hydraulic pressure control in which the commanded hydraulic pressure value of the first variable-diameter pulley is not temporarily reduced.

BRIEF DESCRIPTION OF THE DRAWINGS

FIG. 10 is a flow chart illustrating a major portion of a control operation of the electronic control device of FIG. 2, namely, a control operation to control a rapid shift-down action of the belt-type transmission.

MODE FOR CARRYING OUT THE INVENTION

An embodiment of the present invention will be described in detail by reference to the drawings.

Embodiment

Figure 1:
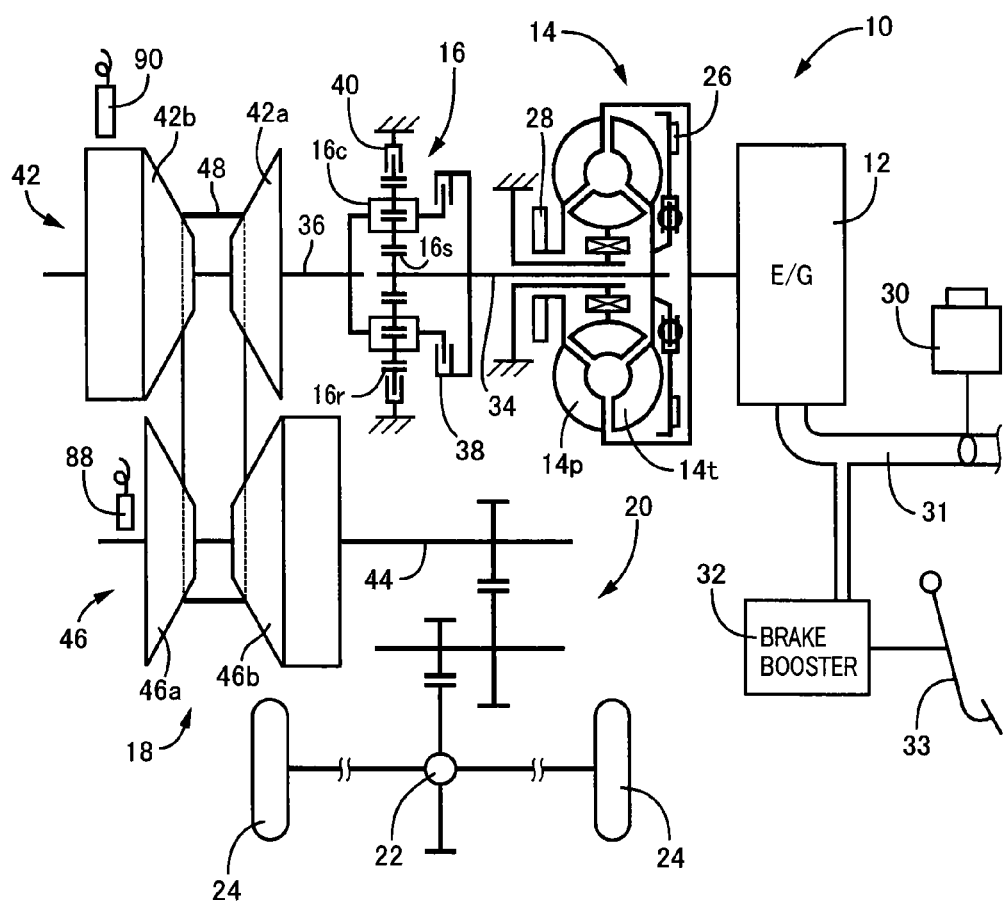
FIG. 1 is a schematic view of a vehicular drive system to which the present invention is applicable.

FIG. 1 is the schematic view of a vehicular drive system 10 to which the present invention is applicable. This vehicular drive system 10 is of a transverse type suitably used on an FF-type vehicle (front-engine front-drive vehicle), and is provided with an internal combustion engine in the form of an engine 12 used as a vehicle drive power source, a torque converter 14, a forward-reverse switching device 16, a belt-type transmission (CVT) 18, a speed reduction gear device 20, and a differential gear device 22. An output of the engine 12 is transmitted from the torque converter 14 to the differential gear device 22 through the forward-reverse switching device 16, belt-type transmission 18 and speed reduction gear device 20, and is distributed to right and left drive wheels 24.

The engine 12 is provided with an electric throttle valve 30 electrically controlled to adjust its intake air quantity. According to an output of the engine 12 required by an operator of the vehicle, which is represented by an operation amount Acc of an accelerator pedal, for instance, an electronic control device 80 (shown in FIG. 2) implements engine output controls such as a control to open and close the electric throttle valve 30, and a fuel injection control, to control the output of the engine 12 to increase or decrease. A brake booster 32 is connected to an intake pipe 31 of the engine 12, so that an operating force (braking force) acting on a foot brake pedal 33 is boosted by a negative pressure within the intake pipe 31.

The torque converter 14 is provided with a pump impeller 14$p$ connected to a crankshaft of the engine 12, and a turbine impeller 14$t$ connected to the forward-reverse switching device 16 through a turbine shaft 34, and is constructed to transmit power through a working fluid. Between those pump impeller 14$p$ and turbine impeller 14$t$, there is disposed a lock-up clutch 26 operable to connect these two impellers 14$p$, 14$t$ together for rotation as a unit. The above-described pump impeller 14$p$ is provided with a mechanical oil pump 28 configured to generate a hydraulic pressure used to implement a shift control of the belt-type transmission 18, to cause variable-diameter pulleys 42, 46 of the transmission 18 to generate a squeezing force acting on a transmission belt 48, and to supply a lubricant to various parts.

The forward-reverse switching device 16 is constituted by a planetary gear set of a double-pinion type having a sun gear 16$s$ connected to the turbine shaft 34 of the torque converter 14, and a carrier 16$c$ connected to an input shaft 36 of the belt-type transmission 18. When a direct coupling clutch 38 disposed between the carrier 16$c$ and the sun gear 16$s$ is placed in its engaged state, the forward-reverse switching device 16 is rotated as a unit, and the turbine shaft 34 is connected directly to the input shaft 36, so that a forward driving force is transmitted to the drive wheels 24. When a reaction brake 40 disposed between a ring gear 16$r$ and a housing is placed in its engaged state while the above-indicated direct coupling clutch 38 is placed in its released state, the input shaft 36 is rotated in a direction opposite to the direction of rotation of the turbine shaft 34, so that a reverse driving force is transmitted to the drive wheels 24. When the direct coupling clutch 38 and the reaction brake 40 are both placed in their released state, a power transmitting path between the engine 12 and the belt-type transmission 18 is cut off. Each of the direct coupling clutch 38 and reaction brake 40 is a hydraulically operated frictional coupling device functioning as a power cut-off device operable to cut off the power transmitting path between the engine 12 and the belt-type transmission 18.

As shown in FIG. 1, the belt-type transmission 18 is a continuously variable automatic transmission disposed in a power transmitting path and operable to continuously change its speed ratio $\gamma$. The belt-type transmission 18 has the first variable-diameter pulley 42 (input-side variable-diameter pulley 42) a V-groove width of which is variable, the second variable-diameter pulley 46 (output-side variable-diameter pulley 46) a V-groove width of which is variable, and the transmission belt 48 connecting the pair of variable-diameter pulleys 42, 46. The first variable-diameter pulley 42 is mounted on the input shaft 36 while the second variable-diameter pulley 46 is mounted on an output shaft 44. A torque is transmitted between the variable-diameter pulleys 42 and 46, by friction forces between the transmission belt 48 and the variable-diameter pulleys 42, 46. Namely, the variable-diameter pulleys 42, 46 generate torque capacities Tc due to the friction force between the variable-diameter pulleys 42, 46 and the transmission belt 48 respectively.

Figure 3:
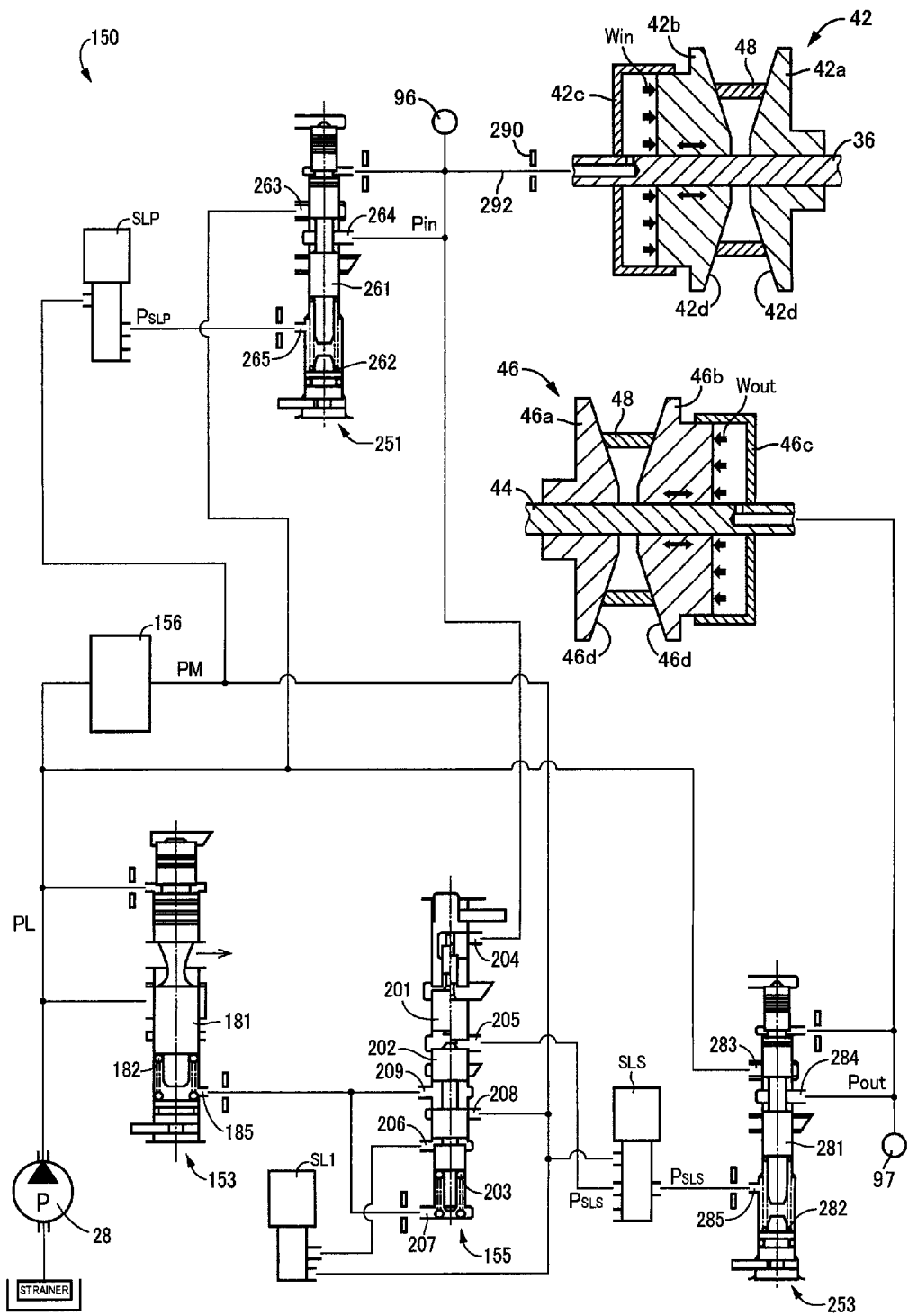
FIG. 3 is a hydraulic circuit diagram showing major parts of a hydraulic control circuit provided in the vehicular drive system of FIG. 1, which relate to a belt squeezing force control and a speed ratio control of a belt-type transmission.

The pair of variable-diameter pulleys 42, 46 are respectively mounted on a pair of mutually parallel rotary shafts in the form of the input shaft 36 and output shaft 44. As shown in FIG. 3, one of the pair of variable-diameter pulleys 42, 46, that is, the first variable-diameter pulley 42 has a stationary pulley 42$a$ fixed to the input shaft 36, and a movable pulley 42$b$ not rotatable relative to the input shaft 36 and axially movable relative to the input shaft 36. The movable pulley 42$b$ has a hydraulic cylinder 42$c$ which receives a hydraulic pressure from an output port 264 of a first hydraulic pressure control valve 251, so that the received hydraulic pressure acts on the movable pulley 42$b$ to change the above-described V-groove width. As also shown in FIG. 3, the second variable-diameter pulley 46 has a stationary pulley 46$a$ fixed to the output shaft 44, and a movable pulley 46$b$ not rotatable relative to the output shaft 44 and axially movable relative to the output shaft 44. The movable pulley 46$b$ has a hydraulic cylinder 46$c$ which receives a hydraulic pressure from an output port 284 of a second hydraulic pressure control valve 253, so that the received hydraulic pressure acts on the movable pulley 46$b$ to change the above-described V-groove width.

The hydraulic pressure within the hydraulic cylinder 42$c$ of the first variable-diameter pulley 42 is controlled by a hydraulic control circuit 150 (shown in FIG. 2), to change the V-groove widths of the two variable-diameter pulleys 42, 46 for thereby changing their effective diameters at which the transmission belt 48 engages the variable-diameter pulleys 42, 46, so that the speed ratio $\gamma$ (=input shaft speed Nin/output shaft speed Nout) is continuously variable. The above-indicated input shaft speed Nin is the rotating speed of the input shaft 36, while the above-indicated output shaft speed Nout is the rotating speed of the output shaft 44. In the present embodiment, the above-indicated rotating speed of the input shaft 36 (input shaft speed Nin) is equal to the rotating speed of the first variable-diameter pulley 42, while the above-indicated rotating speed of the output shaft 44 (output shaft speed Nout) is equal to the rotating speed of the second variable-diameter pulley 46, as is apparent from FIG. 1.

The transmission belt 48 is a compression type belt (metallic belt) configured to be used for a belt-type transmission, which connects the first variable-diameter pulley 42 and second variable-diameter pulley 46. The first and second variable-diameter pulleys 42, 46 have respective V-grooves the widths of which are variable and which are open in their radially outward direction. The above-indicated transmission belt 48 engages the V-grooves of the variable-diameter pulleys 42, 46. The V-groove of each of the variable-diameter pulleys 42, 46 is defined by a pair of conical sheave surfaces 42d, 46d an axial distance between which increases in the radially outward direction.

Figure 2:
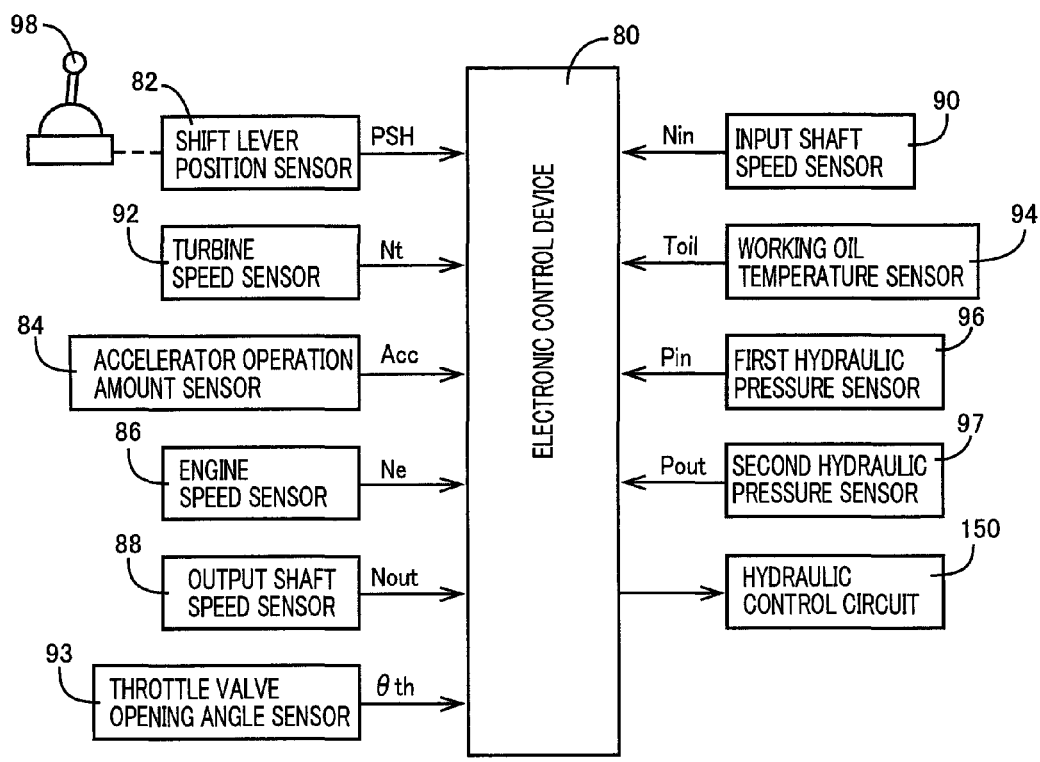
FIG. 2 is a view for explaining input and output signals of an electronic control device provided to control the vehicular drive system of FIG. 1.

The electronic control device 80 shown in FIG. 2 includes a microcomputer which operates to perform signal processing operations for the shift control and belt squeezing force control of the above-described belt-type transmission 18, according to control programs preliminarily stored in a ROM while utilizing a temporary data storage function of a RAM. This electronic control device 80 and the vehicular drive system 10 correspond to a vehicular shift control apparatus according to the present invention. The electronic control device 80 receives input signals such as: an output signal of a shift lever position sensor 82 indicative of an operating position PSH of a shift lever 98; an output signal of an accelerator pedal operation amount sensor 84 indicative of the operation amount Acc of the accelerator pedal; an output signal of an engine speed sensor 86 indicative of an operating speed Ne of the engine 12; an output signal of an output shaft speed sensor 88 indicative of the output shaft speed Nout (corresponding to a running speed V of the vehicle); an output signal of an input shaft speed sensor 90 indicative of the input shaft speed Nin; an output signal of a turbine speed sensor 92 indicative of a turbine speed Nt; an output signal of a throttle valve opening angle sensor 93 indicative of an opening angle θth of the electric throttle valve 30; an output signal of a working oil temperature sensor 94 indicative of a temperature Toil of a working oil in the hydraulic circuit of the belt-type transmission 18; an output signal of a first hydraulic pressure sensor 96 indicative of an output hydraulic pressure of the first hydraulic pressure control valve 251, that is, a first supply hydraulic pressure Pin to be applied to the first variable-diameter pulley 42; and an output signal of a second hydraulic pressure sensor 97 indicative of an output hydraulic pressure of the second hydraulic pressure control valve 253, that is, a second supply hydraulic pressure Pout to be applied to the second variable-diameter pulley 46. For example, the electronic control device 80 calculates from time to time the speed ratio γ of the belt-type transmission 18 on the basis of the output shaft speed Nout detected by the output shaft speed sensor 88, and the input shaft speed Nin detected by the input shaft speed sensor 90.

The electronic control device 80 further receives other signals representative of various kinds of information necessary for the shift control and belt squeezing force control of the belt-type transmission 18, such as a signal indicative of an intake air quantity Q of the engine 12, a signal indicative of a cooling water temperature Tw of the engine 12, a signal indicative of an electric load ELS of an alternator, a signal indicative of a requirement for a fuel cut to stop a fuel supply to the engine 12 during a coasting run of the vehicle with the accelerator pedal placed in its non-operated position, a signal indicative of a requirement for reduction of the number of engine cylinders to be operated, a signal indicative of a requirement for an operation of an air conditioner, and a signal indicative of a requirement for engagement of the lock-up clutch 26.

FIG. 3 is the hydraulic circuit diagram representing major parts of the hydraulic control circuit 150 of the vehicle, which relate to the belt squeezing force control and a speed ratio control of the belt-type transmission 18. As shown in FIG. 3, the hydraulic control circuit 150 is provided with the oil pump 28, a linear solenoid valve SLP, a linear solenoid valve SLS, an ON-OFF solenoid valve SL1, a modulator valve 156, the first hydraulic pressure control valve 251, the second hydraulic pressure control valve 253, a primary regulator valve 153, and a select reducing valve 155.

The primary regulator valve 153 has a axially movable spool 181, and regulates the hydraulic pressure generated by the oil pump 28, to provide a line pressure PL. The spool 181 is biased by a spring 182 disposed in abutting contact with one axial end (lower end as seen in FIG. 3) thereof, and the primary regulator valve 153 has a control hydraulic pressure port 185 formed in an axial end portion thereof corresponding to the above-indicated axial end of the spool 181. The control hydraulic pressure port 185 is connected to an output port 209 of the select reducing valve 155, to receive an output hydraulic pressure of the select reducing valve 155. The primary regulator valve 153 constructed as described above is operated according to the output hydraulic pressure of the select reducing valve 155 received as a pilot pressure, to regulate the above-indicated line pressure PL.

The line pressure PL regulated by the primary regulator valve 153 is applied to an input port 263 of the first hydraulic pressure control valve 251, an input port 283 of the second hydraulic pressure control valve 253, and the modulator valve 156.

The modulator valve 156 is a pressure regulating valve provided to regulate the above-described line pressure PL to a predetermined modulator hydraulic pressure PM lower than the line pressure PL. This modulator hydraulic pressure PM is applied to the linear solenoid valve SLP, linear solenoid valve SLS, ON-OFF solenoid valve SL1, and an input port 208 of the select reducing valve 155.

The linear solenoid valve SLP, which is a solenoid valve of a normally-open type, for instance, is configured to generate a control hydraulic pressure (output hydraulic pressure) $P_{SLP}$ corresponding to a control current that is duty-controlled by the electronic control device 80. This control hydraulic pressure $P_{SLP}$ is applied to a control hydraulic pressure port 265 of the first hydraulic pressure control valve 251.

The linear solenoid valve SLS, which is a solenoid valve of a normally-open type, for instance, is configured to generate a control hydraulic pressure (output hydraulic pressure) $P_{SLS}$ corresponding to a control current that is duty-controlled by the electronic control device 80. This control hydraulic pressure $P_{SLS}$ is applied to a control hydraulic pressure port 285 of the second hydraulic pressure control valve 253.

The ON-OFF solenoid valve SL1, which is a solenoid valve of a normally-open type, for instance, is placed in an open state for permitting its control hydraulic pressure to be applied to a third control hydraulic pressure port 206 of the select reducing valve 155 when the ON-OFF solenoid valve SL1 is not energized, and is placed in a closed state for inhibiting the control hydraulic pressure from being applied to the third control hydraulic pressure port 206 when the ON-OFF solenoid valve SL1 is energized.

The first hydraulic pressure control valve 251 has: an axially movable spool 261; a spring 262 disposed in abutting contact with one axial end (lower end as seen in FIG. 3) of the spool 261 in a manner that the spring 262 can be compressed; the control hydraulic pressure port 265 formed in an axial end portion corresponding to the above-indicated axial end of the spool 261, to receive the above-indicated control hydraulic pressure $P_{SLP}$; the input port 263 which receives the line pressure PL; and the output port 264 connected to the hydraulic cylinder 42c of the first variable-diameter pulley 42 and to a first control hydraulic pressure port 204 of the select reducing valve 155. The first hydraulic pressure control valve 251 is a hydraulic pressure control valve configured to regulate the first supply hydraulic pressure Pin to be supplied to the hydraulic cylinder 42c of the first variable-diameter pulley 42. Namely, the first hydraulic pressure control valve 251 is operated according to the control hydraulic pressure $P_{SLP}$ of the linear solenoid valve SLP received as a pilot pressure, to regulate the line pressure PL to the first supply hydraulic pressure Pin to be applied to the hydraulic cylinder 42c of the first variable-diameter pulley 42. An oil passage 292 between the hydraulic cylinder 42c of the first variable-diameter pulley 42 and the first hydraulic pressure control valve 251 is provided with an orifice 290 which functions to prevent rapid reduction of the hydraulic pressure within the hydraulic cylinder 42c of the first variable-diameter pulley 42 even in the event of a failure of the linear solenoid valve SLP, for example, for thereby preventing abrupt deceleration of the vehicle in the event of the failure of the linear solenoid valve SLP. Accordingly, due to the orifice 290, the hydraulic pressure within the hydraulic cylinder 42c can be kept at a level high enough to prevent slipping of the transmission belt, even when a commanded value of the first supply hydraulic pressure Pin (commanded first variable-diameter pulley hydraulic pressure value Pintgt) is held at 0 MPa for a short length of time.

If the control hydraulic pressure $P_{SLP}$ generated by the linear solenoid valve SLP is increased when a predetermined value of the first supply hydraulic pressure Pin is applied to the hydraulic cylinder 42c of the first variable-diameter pulley 42, the spool 261 of the first hydraulic pressure control valve 251 is moved upwards as seen in FIG. 3, so that the first supply hydraulic pressure Pin to be applied to the above-indicated hydraulic cylinder 42c is increased.

If the control hydraulic pressure $P_{SLP}$ generated by the linear solenoid valve SLP is reduced, on other hand, when the predetermined value of the first supply hydraulic pressure Pin is applied to the hydraulic cylinder 42c of the first variable-diameter pulley 42, the spool 261 of the first hydraulic pressure control valve 251 is moved downwards as seen in FIG. 3, so that the first supply hydraulic pressure Pin to be applied to the above-indicated hydraulic cylinder 42c is reduced.

The second hydraulic pressure control valve 253, which is identical in construction with the first hydraulic pressure control valve 251, has: an axially movable spool 281; a spring 282 disposed in abutting contact with one axial end (lower end as seen in FIG. 3) of the spool 281; the control hydraulic pressure port 285 formed in an axial end portion corresponding to the above-indicated axial end of the spool 281, to receive the above-indicated control hydraulic pressure $P_{SLS}$; the input port 283 which receives the line pressure PL; and the output port 284 connected to the hydraulic cylinder 46c of the second variable-diameter pulley 46. The second hydraulic pressure control valve 253 is a hydraulic pressure control valve configured to regulate the second supply hydraulic pressure Pout to be supplied to the hydraulic cylinder 46c of the second variable-diameter pulley 46. Namely, the second hydraulic pressure control valve 253 is operated according to the control hydraulic pressure $P_{SLS}$ of the linear solenoid valve SLS received as a pilot pressure, to regulate the line pressure PL to the second supply hydraulic pressure Pout to be applied to the hydraulic cylinder 46c of the second variable-diameter pulley 46.

If the control hydraulic pressure $P_{SLS}$ generated by the linear solenoid valve SLS is increased when a predetermined value of the second supply hydraulic pressure Pout is applied to the hydraulic cylinder 46c of the second variable-diameter pulley 46, the spool 281 of the second hydraulic pressure control valve 253 is moved upwards as seen in FIG. 3, so that the second supply hydraulic pressure Pout to be applied to the above-indicated hydraulic cylinder 46c is increased.

If the control hydraulic pressure $P_{SLS}$ generated by the linear solenoid valve SLS is reduced, on other hand, when the predetermined value of the second supply hydraulic pressure Pout is applied to the hydraulic cylinder 46c of the second variable-diameter pulley 46, the spool 281 of the second hydraulic pressure control valve 253 is moved downwards as seen in FIG. 3, so that the second supply hydraulic pressure Pout to be applied to the above-indicated hydraulic cylinder 46c is reduced.

Described more specifically, the first supply hydraulic pressure Pin and the second supply hydraulic pressure Pout are respectively regulated by the linear solenoid valve SLP and the linear solenoid valve SLS to enable the variable-diameter pulleys 42, 46 to generate the belt squeezing force which is sufficient to prevent slipping of the transmission belt and which is not unnecessary large. Further, based on the relationship between the first supply hydraulic pressure Pin and the second supply hydraulic pressure Pout, a thrust force ratio Rw (=Wout/Win) of the variable-diameter pulleys 42, 46 is changed for thereby changing the speed ratio γ of the belt-type transmission 18, as described below. For example, the speed ratio γ is increased when the thrust force ratio Rw is increased.

The select reducing valve 155 is provided to apply the pilot pressure to the primary regulator valve 153 for regulating the line pressure PL. The select reducing valve 155 has: an axially movable first spool 201; an axially movable second spool 202 disposed coaxially and in series with the first spool 201; a spring 203 disposed in abutting contact with one axial end (lower end as seen in FIG. 3) of the second spool 202 remote from the first spool 201; a first control hydraulic pressure port 204 formed in an end portion thereof remote from the spring 203 such that the first and second spools 201, 202 are located between the first control hydraulic pressure port 204 and the spring 203; a second control hydraulic pressure port 205 formed to apply a hydraulic pressure to a space between the first and second spools 201, 202; and a third control hydraulic pressure port 206 formed in an end portion thereof in which the spring 203 is disposed. The first control hydraulic pressure port 204 is connected to (held in communication with) the output port 264 of the first hydraulic pressure control valve 251, so that the hydraulic pressure regulated by the first hydraulic pressure control valve 251, that is, the first supply hydraulic pressure Pin to be applied to the above-described hydraulic cylinder 42c is applied to the first control hydraulic pressure port 204. The second control hydraulic pressure port 205 is connected to the linear solenoid valve SLS, so that the control hydraulic pressure $P_{SLS}$ generated by the linear solenoid valve SLS is applied to the second control hydraulic pressure port 205. The third control hydraulic pressure port 206 is connected to the ON-OFF solenoid valve SL1, so that the control hydraulic pressure generated by the ON-OFF solenoid valve SL1 is applied to the third control hydraulic pressure port 206.

The select reducing valve 155 further has: a feedback port 207 formed in the end portion in which the spring 203 is disposed; an input port 208 connected to the modulator valve 156; and an output port 209 connected to the control hydraulic pressure port 185 of the primary regulator valve 153.

The select reducing valve 155 constructed as described above is operated according to pilot pressures which are: the output hydraulic pressure Pin of the first hydraulic pressure control valve 251 received through the first control hydraulic pressure port 204; the control hydraulic pressure $P_{SLS}$ of the linear solenoid valve SLS received through the second control hydraulic pressure port 205; and the control hydraulic pressure of the ON-OFF solenoid valve SL1 received through the third control hydraulic pressure port 206.

Described in detail, a larger one of a thrust force acting on the first spool 201 based on the output hydraulic pressure Pin of the first hydraulic pressure control valve 251 and a thrust force acting on the second spool 202 based on the control hydraulic pressure $P_{SLS}$ of the linear solenoid valve SLS contributes to the regulation of the output hydraulic pressure of the select reducing valve 155. If the thrust force acting on the first spool 201 based on the output hydraulic pressure Pin of the first hydraulic pressure control valve 251 is larger, for example, the first and second spools 201, 202 are moved axially (vertically as seen in FIG. 3) as a unit, in contact with each other, as indicated by a right half of the select reducing valve 155 shown in FIG. 3. Accordingly, the output pressure generated from the output port 209 of the select reducing valve 155 is regulated according to the output hydraulic pressure Pin of the first hydraulic pressure control valve 251.

If the thrust force acting on the second spool 202 based on the control hydraulic pressure $P_{SLS}$ of the linear solenoid valve SLS is larger, on the other hand, the second spool 202 is moved axially (vertically as seen in FIG. 3), in a spaced-apart relationship with each other, as indicated by a left half of the select reducing valve 155 shown in FIG. 3. Accordingly, the output pressure generated from the output port 209 of the select reducing valve 155 is regulated according to the control hydraulic pressure $P_{SLS}$ of the linear solenoid valve SLS.

The control hydraulic pressure of the ON-OFF solenoid valve SL1 acts on the second spool 202 only when this ON-OFF solenoid valve SL1 is placed in the open state (in the de-energized state), and does not act on the second spool 202 when the ON-OFF solenoid valve SL1 is placed in the closed state (in the energized state). That is, the control hydraulic pressure of the ON-OFF solenoid valve SL1 contributes to the regulation of the output pressure generated from the above-indicated output port 209 only when the ON-OFF solenoid valve SL1 is placed in the above-indicated open state (de-energized state), and does not contribute to the regulation when the ON-OFF solenoid valve SL1 is placed in the above-indicated closed state (energized state).

Accordingly, when the ON-OFF solenoid valve SL1 is placed in the open state, the second spool 202 is moved in the axial direction (vertical direction as seen in FIG. 3) according to a balance between the above-described larger one of the thrust forces and a sum of the thrust force acting on the second spool 202 based on the control hydraulic pressure of the ON-OFF solenoid valve SL1 and a biasing force of the spring 203. As a result, the select reducing valve 155 regulates the modulator hydraulic pressure PM received by the input port 208, and generates the regulated modular hydraulic pressure PM from the output port 209.

When the ON-OFF solenoid valve SL1 is placed in the closed state, on the other hand, the second spool 202 is moved in the axial direction (vertical direction as seen in FIG. 3), according to a balance between the above-described larger one of the thrust forces and the biasing force of the spring 203. As a result, the select reducing valve 155 regulates the modulator hydraulic pressure PM received by the input port 208, and generates the regulated modular hydraulic pressure PM from the output port 209.

The primary regulator valve 153 is operated according to the output hydraulic pressure of the select reducing valve received as the pilot pressure from the output port 209, to regulate the line pressure PL.

According to the hydraulic circuit arrangement described above, the second spool 202 is moved in the downward direction as seen in FIG. 3 to increase the output hydraulic pressure of the select reducing valve 155 when the ON-OFF solenoid valve SL1 is placed in the closed state in which its control hydraulic pressure does not act on the second spool 202, that is different from the open state, if the output hydraulic pressure Pin of the first hydraulic pressure control valve 251 and the control hydraulic pressure $P_{SLS}$ of the linear solenoid valve SLS remain unchanged. When the ON-OFF solenoid valve SL1 is placed in the open state in which its control hydraulic pressure acts on the second spool 202, that is different from the closed state, the second spool 202 is moved in the upward direction as seen in FIG. 3 to reduce the output hydraulic pressure of the select reducing valve 155. Accordingly, the output hydraulic pressure of the select reducing valve 155 can be changed by an amount corresponding to the control hydraulic pressure of the ON-OFF solenoid valve SL1, by switching the ON-OFF solenoid valve SL1 between the closed and open states. Further, the line pressure PL can be raised and lowered by an amount corresponding to the control hydraulic pressure of the ON-OFF solenoid valve SL1, by switching the ON-OFF solenoid valve SL1 between the closed and open states.

Described more specifically, the ON-OFF solenoid valve SL1 is placed in the de-energized state and thus placed in the open state, in a normal running state of the vehicle. Further, the line pressure PL is regulated by the primary regulator valve 153 and select reducing valve 155, such that the line pressure is made higher by a suitable margin value than a higher one of the output hydraulic pressure Pin of the first hydraulic pressure control valve 251 and the output hydraulic pressure Pout of the second hydraulic pressure control valve 253. Accordingly, the pressure regulating operations of the first hydraulic pressure control valve 251 and the second hydraulic pressure control valve 253 can be performed so as to prevent the line pressure PL as main pressure from being insufficiently low or unnecessarily high. On the other hand, an amount of change $\Delta\gamma$ of the speed ratio $\gamma$ per unit time, namely, a shifting speed $\Delta\gamma$ of the transmission is required to be increased for a rapid shifting operation during running in a manual shifting mode. When the above-described shifting speed $\Delta\gamma$ is higher than a predetermined upper limit, for instance, the ON-OFF solenoid valve SL1 is energized and brought into its closed state, so that the line pressure PL is raised at a higher rate than when the ON-OFF solenoid valve SL1 is placed in the open state. Accordingly, it is possible to prevent the line pressure PL from being insufficiently low even when the shifting with high shifting speed (a rapid shifting) is performed.

Figure 4:
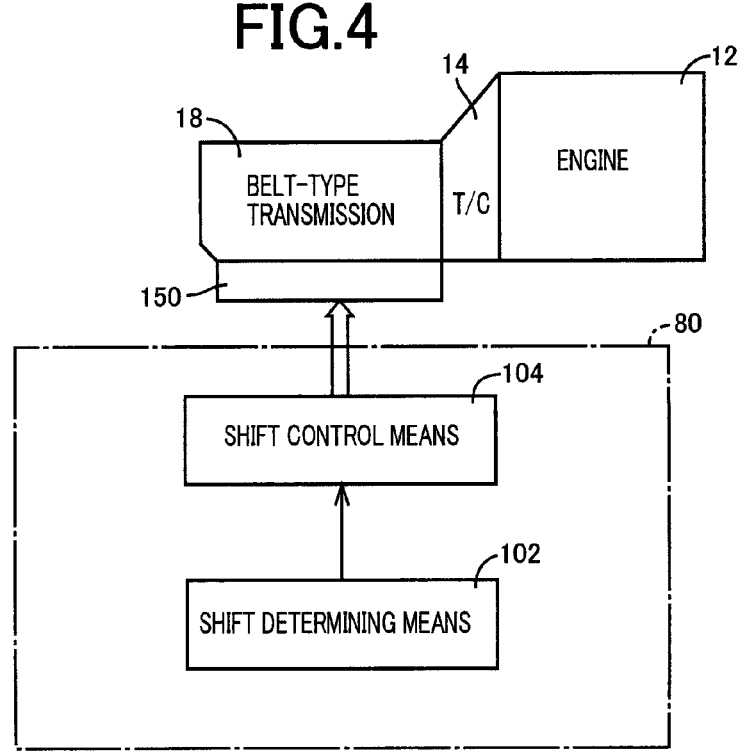
FIG. 4 is a functional block diagram for explaining major control functions of the electronic control device of FIG. 2.

FIG. 4 is the functional block diagram for explaining major control functions of the electronic control device 80. As shown in FIG. 4, the electronic control device 80 is provided with a shift determining portion in the form of shift determining means 102, and a shift control portion in the form of shift control means 104.

The shift determining means 102 is configured to determine conditions relating to a shifting action (a shift-down action or a shift-up action) of the belt-type transmission 18, and to make a determination relating to the shifting action. Described more specifically, the shift determining means 102 functions as target speed ratio determining means for determining a final target value $\gamma 1^*$ of the speed ratio $\gamma$ of the belt-type transmission 18 to be established after a shifting action. For example, the shift determining means 102 stores a shifting map representative of a relationship between the final target speed ratio value γ1* and the vehicle speed V and the accelerator pedal operation amount Acc, which relationship is obtained by experimentation. The shift determining means 102 determines the final target speed ratio value γ1* on the basis of the vehicle speed V and accelerator pedal operation amount Acc, and according to the shifting map. Further, the shift determining means 102 determines transient target values of speed ratio γ, i.e., transient target speed ratio values γ* during a shifting action, on the basis of a difference between the initial speed ratio value γ before initiation of the shifting action and the determined final target speed ratio value γ1*, and according to the relationship obtained by experimentation so as to achieve the shifting action in an efficient and smooth manner. For instance, the shift determining means 102 changes the transient target speed ratio value γ* from time to time during the shifting action, from the initial speed ratio value γ toward the final target speed ratio value γ1*, namely, determines the transient target speed ratio values γ*, as a function of time along a smooth curve (a primary time lag curve). That is, the shift determining means 102 changes the transient target speed ratio value γ* from time to time during the shifting action of the belt-type transmission 18, according to an elapse of time from the moment of initiation of the shifting action, so that the transient target speed ratio value γ* changes from the initial speed ratio value γ toward the final target speed ratio value γ1*. A rate of change of this transient target speed ratio value γ* is a target value Δγ* of the above-described shifting speed Δγ. Namely, the shift determining means 102, which determines the transient target speed ratio values γ* as the above-indicated function of time, determines the target shifting speed value Δγ* during the shifting action. For instance, the target shifting speed value Δγ* is zeroed when the transient target speed ratio value γ* is kept constant after termination of the shifting action.

The shift determining means 102 determines that the shifting action to be performed under the control of the shift control means 104 is a rapid shift-down action, if the final target speed ratio value γ1* determined as described above is larger than the initial speed ratio value γ (if γ1*>γ) and if a difference (=γ1*−γ) between the final target speed ratio value γ1* and the initial speed ratio value γ is larger than a rapid-shifting determining upper limit which is predetermined by experimentation to determine whether the shifting action is the rapid shift-down action.

The shift control means 104 receives from time to time the transient speed ratio value γ* and the target shifting speed value Δγ* determined by the shift determining means 102, and determines a first-variable-diameter-pulley commanded hydraulic pressure value Pintgt which is a commanded or target value of the above-described first supply hydraulic pressure Pin, and a second-variable-diameter-pulley commanded hydraulic pressure value Pouttgt which is a commanded or target value of the above-described second supply hydraulic pressure Pout, so that the transient speed ratio value γ* and the target shifting speed value Δγ* are established without slipping of the transmission belt. Then, the shift control means 104 implements a feedback control by adjusting electric currents to be applied to the linear solenoid valve SLP and linear solenoid valve SLS, such that the first supply hydraulic pressure Pin detected by the first hydraulic pressure sensor 96 coincides with the first-variable-diameter-pulley commanded hydraulic pressure value Pintgt, while the second supply hydraulic pressure Pout detected by the second hydraulic pressure sensor 97 coincides with the second-variable-diameter-pulley commanded hydraulic pressure value Pouttgt. Thus, the shift control means 104 controls the hydraulic pressure of (within) the hydraulic cylinder 42c of the first variable-diameter pulley 42 and the hydraulic pressure of (within) the hydraulic cylinder 46c of the second variable-diameter pulley 46, according to the first-variable-diameter-pulley commanded hydraulic pressure value Pintgt and the second-variable-diameter-pulley commanded hydraulic pressure value Pouttgt respectively, for thereby controlling the speed ratio γ of the belt-type transmission 18 so that the speed ratio γ coincides with the transient target speed ratio γ*.

Figure 5:
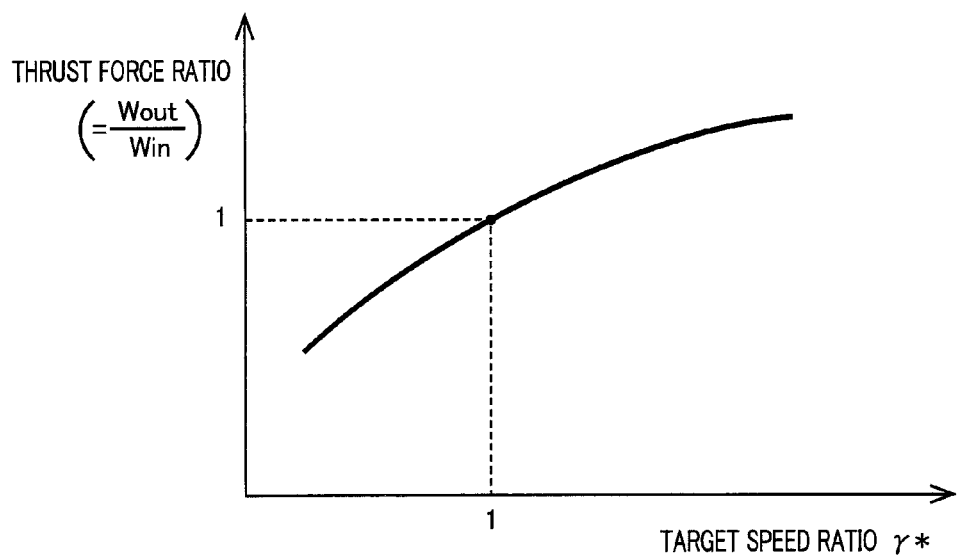
FIG. 5 is a view indicating a relationship between a target speed ratio of the belt-type transmission and a thrust force ratio of its variable-diameter pulleys, which is predetermined to determine the above-indicated thrust force ratio on the basis of the above-indicated target speed ratio, in a hydraulic control implemented by the electronic control device of FIG. 2 to shift the belt-type transmission.

For determining the first-variable-diameter-pulley commanded hydraulic pressure value Pintgt and the second-variable-diameter-pulley commanded hydraulic pressure value Pouttgt, the shift control means 104 determines the thrust force ratio Rw (=Wout/Win) on the basis of the transient target speed ratio value γ* and according to the relationship as indicated in FIG. 5, which is obtained by experimentation. The thrust force ratio Rw is a ratio of a first-variable-diameter-pulley thrust force Win (unit is N, for example) generated by the hydraulic cylinder 42c of the first variable-diameter pulley 42 in the axial direction to a second-variable-diameter-pulley thrust force Wout (unit is N, for example) generated by the hydraulic cylinder 46c of the second variable-diameter pulley 46 in the axial direction. This thrust force ratio Rw increases with an increase of the transient target speed ratio value γ*, as indicated in FIG. 5, and the thrust force ratio Rw determined on the basis of the above-indicated transient target speed ratio value γ* is a thrust force ratio Rw for steadily holding the speed ratio γ of the belt-type transmission 18 at the transient target speed ratio value γ*, that is, a thrust force ration Rw for holding the speed ratio γ constant at the transient target speed ratio value γ*.

When the shift determining means 102 determines that the shifting action to be performed is the above-indicated rapid shift-down action, namely, that the shifting action to be performed to establish the transient target speed ratio value γ* and target shifting speed value Δγ* determined by the shift determining means 102 is the rapid shift-down action, the shift control means 104 obtains the first supply hydraulic pressure Pin on the basis of the transient target speed ratio value γ* and an estimated input torque of the input shaft 36 estimated from the throttle valve opening angle θth, engine speed Ne, turbine speed Nt, etc., and according to a predetermined relationship predetermined by experimentation, such that the obtained first supply hydraulic pressure Pin is as low as possible to prevent slipping of the transmission belt. The shift control means 104 determines the obtained first supply hydraulic pressure Pin as a first variable-diameter-pulley hold pressure Pin_n. At the same time, the shift control means 104 obtains the second supply hydraulic pressure Pout on the basis of the above-indicated first-variable-diameter-pulley hold pressure Pin_n and the thrust force ratio Rw determined on the basis of the above-indicated transient target speed ratio value γ*, while taking account of pressure receiving surface areas of the hydraulic cylinders 42c, 46c of the two variable-diameter pulleys 42, 46, such that the obtained second supply hydraulic pressure Pout establishes the above-indicated thrust force ratio Rw in relation to the first-variable-diameter-pulley hold pressure Pin_n. The shift control means 104 determines the obtained second supply hydraulic pressure Pout as a second variable-diameter-pulley hold pressure Pout_n. The shift control means 104 determines the first-variable-diameter-pulley hold pressure Pin_n and the second-variable-diameter-pulley hold pressure Pout_n, provided that the first supply hydraulic pressure Pin coincides with the hydraulic pressure within the hydraulic cylinder 42c while the second supply hydraulic pressure Pout coincides with the hydraulic pressure within the hydraulic cylinder 46c. Namely, the thus determined first-variable-diameter-pulley hold pressure Pin_n may be called a first-variable-diameter-pulley steady-state pressure, which is the first supply hydraulic pressure Pin for steadily holding the transient target speed ratio value $\gamma^*$, in other words, the first supply hydraulic pressure Pin for holding the speed ratio $\gamma$ constant at the transient target speed ratio value $\gamma^*$, while the second-variable-diameter-pulley hold pressure Pout_n may be called a second-variable-diameter-pulley steady-state pressure, which is the second supply hydraulic pressure Pout for steadily holding the transient target speed ratio value $\gamma^*$, in other words, the second supply hydraulic pressure Pout for holding the speed ratio $\gamma$ constant at the transient target speed ratio value $\gamma^*$. Accordingly, the first-variable-diameter-pulley hold pressure Pin_n and the second-variable-diameter-pulley hold pressure Pout_n vary with a change of the transient target speed ratio value $\gamma^*$ during the shifting action of the belt-type transmission 18.

Figure 6:
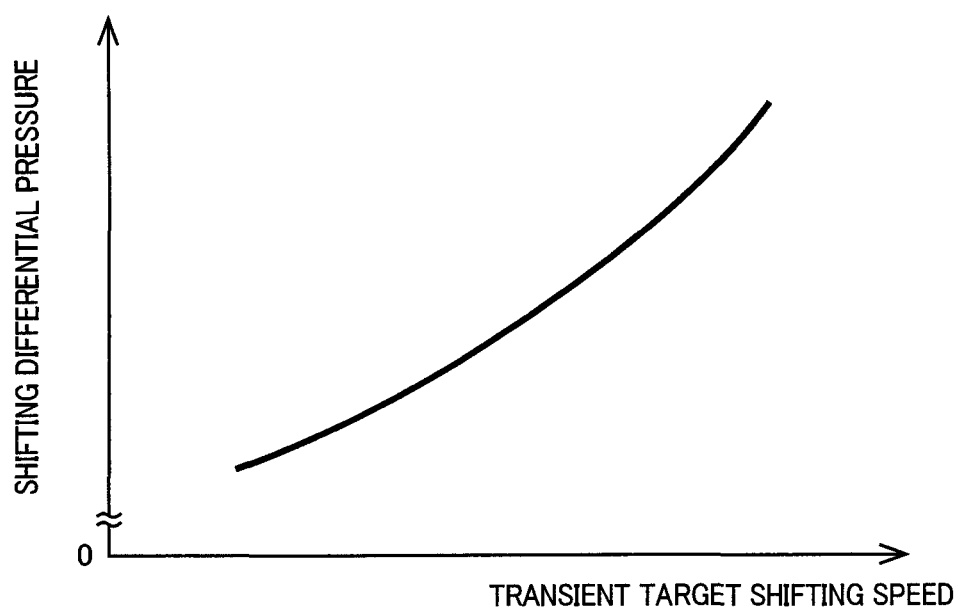
FIG. 6 is a view indicating a relationship between a shifting differential pressure and a target shifting speed of the belt-type transmission, which is predetermined to determine the above-indicated shifting differential pressure on the basis of the above-indicated target shifting speed, in the hydraulic control implemented by the electronic control device of FIG. 2 to shift the belt-type transmission.

The shift control means 104 determines a shifting differential pressure Pdf for establishing the target shifting speed value $\Delta\gamma^*$, as well as the above-indicated first-variable-diameter-pulley hold pressure Pin_n and second-variable-diameter-pulley hold pressure Pout_n. Described more specifically, the shift control means 104 stores a relationship between the shifting differential pressure Pdf and the target shifting speed value $\Delta\gamma^*$ as indicated in FIG. 6, which is obtained by experimentation. The shift control means 104 determines the shifting differential pressure Pdf on the basis of the target shifting speed value $\Delta\gamma^*$, and according to the relationship of FIG. 6. As is apparent from FIG. 6, the shifting differential pressure Pdf is zero or a positive value, and is determined such that the shifting differential pressure Pdf increases with an increase of the target shifting speed value $\gamma\Delta^*$. The shifting differential pressure Pdf is determined to be zero when the target shifting speed value $\Delta\gamma^*$ is zero.

After determination of the first-variable-diameter-pulley hold pressure Pin_n, second-variable-diameter-pulley hold pressure Pout_n and shifting differential pressure Pdf, the shift control means 104 determines the first-variable-diameter-pulley hold pressure Pin_n as the first-variable-diameter-pulley commanded hydraulic pressure value Pintgt, and determines a sum of the second-variable-diameter-pulley hold pressure Pout_n and the shifting differential pressure Pdf as the second-variable-diameter-pulley commanded hydraulic pressure value Pouttgt. Thus, the shift control means 104 determines first-variable-diameter-pulley commanded hydraulic pressure value Pintgt and second-variable-diameter-pulley commanded hydraulic pressure value Pouttgt when it is determined that the shifting operation to be performed is the above-indicated rapid shift-down operation, and implements the above-described feedback control to perform the above-indicated shift-down operation, on the basis of the determined first-variable-diameter-pulley commanded hydraulic pressure value Pintgt and second-variable-diameter-pulley commanded hydraulic pressure value Pouttgt.

Although the shift control means 104 may implement the shifting control to perform the above-indicated rapid shift-down action, the shift control means 104 according to the present embodiment is configured to temporarily compensate the first-variable-diameter-pulley commanded hydraulic pressure value Pintgt, for improving the shifting response in the above-indicated rapid shift-down operation, when it is determined that the shifting action is the rapid shift-down action, in other words, when the first-variable-diameter-pulley hold pressure Pin_n is determined as the first-variable-diameter-pulley commanded hydraulic pressure value Pintgt for performing the shift-down action.

That is, when the shift control means 104 determines the first-variable-diameter-pulley hold pressure Pin_n as the first-variable-diameter-pulley commanded hydraulic pressure value Pintgt for performing the shift-down action, the shift control means 104 implements a commanded hydraulic pressure compensating control in an initial period of the shift-down action, such that the first-variable-diameter-pulley commanded hydraulic pressure value Pintgt is temporarily reduced with respect to the first-variable-diameter-pulley hold pressure Pin_n. This commanded hydraulic pressure compensating control will be explained by reference to the time chart of FIG. 7.

Figure 7:
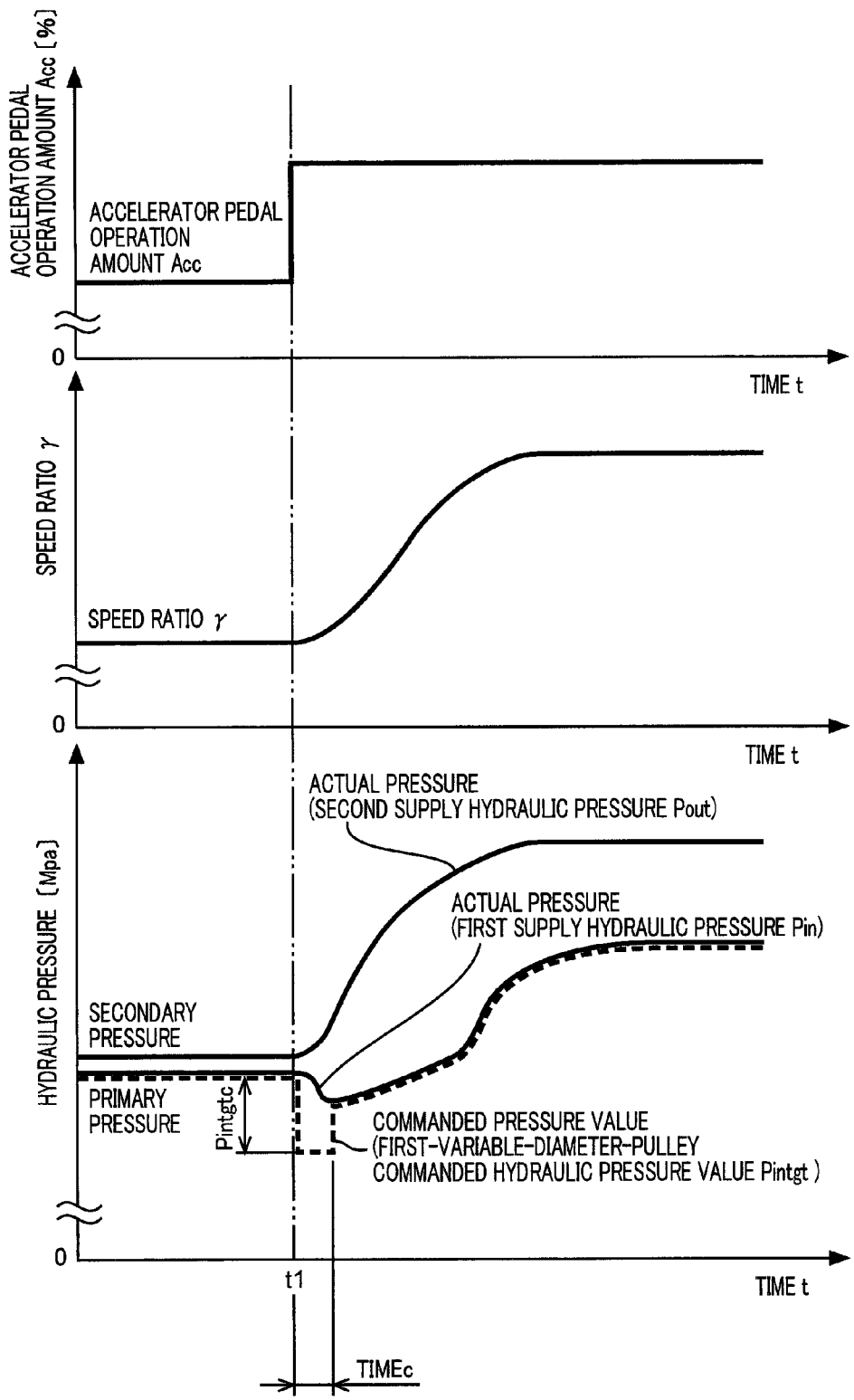
FIG. 7 is a time chart for explaining a compensating control of a commanded hydraulic pressure implemented by the electronic control device of FIG. 2, to perform a rapid shift-down action of the transmission upon a large amount of operation of an accelerator pedal as an example.

FIG. 7 is the time chart for explaining the above-indicated commanded hydraulic pressure compensating control implemented to perform the above-indicated rapid shift-down action upon a large amount of operation of an accelerator pedal as an example. FIG. 7 indicates, by solid lines, the accelerator pedal operation amount Acc detected by the accelerator pedal operation amount sensor 84, the speed ratio $\gamma$ of the belt-type transmission 18 calculated on the basis of the output shaft speed Nout and input shaft speed Nin, the second supply hydraulic pressure (secondary pressure) Pout detected by the second hydraulic pressure sensor 97, and the first supply hydraulic pressure (primary pressure) Pin, which is detected by the first hydraulic pressure sensor 96, in the order of description in the downward direction of the time chart. In addition to the first supply hydraulic pressure Pin (indicated by the solid line), the first-variable-diameter-pulley commanded hydraulic pressure value Pintgt which is the commanded hydraulic pressure value of the first supply hydraulic pressure Pin is indicated by broken line. It is noted that the solid line indicating the first supply hydraulic pressure Pin and the broken line indicating the first-variable-diameter-pulley commanded hydraulic pressure value Pintgt are slightly offset from each other to avoid their overlapping, for easier understanding of the time chart.

Figure 8:
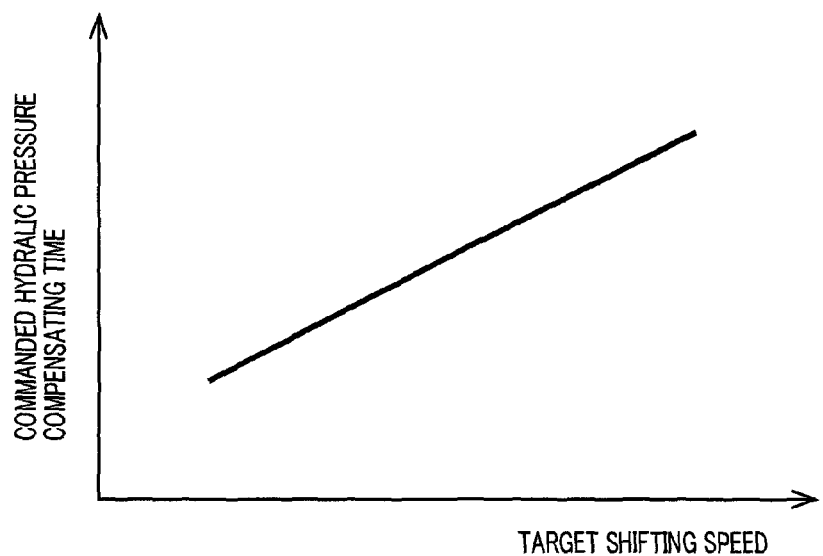
FIG. 8 is a view indicating a relationship between a commanded hydraulic pressure compensating time and the target shifting speed, which is predetermined to determine the above-indicated commanded hydraulic pressure compensating time on the basis of the above-indicated target shifting speed, in the compensation control of the commanded hydraulic pressure implemented by the electronic control device of FIG. 2.
Figure 9:
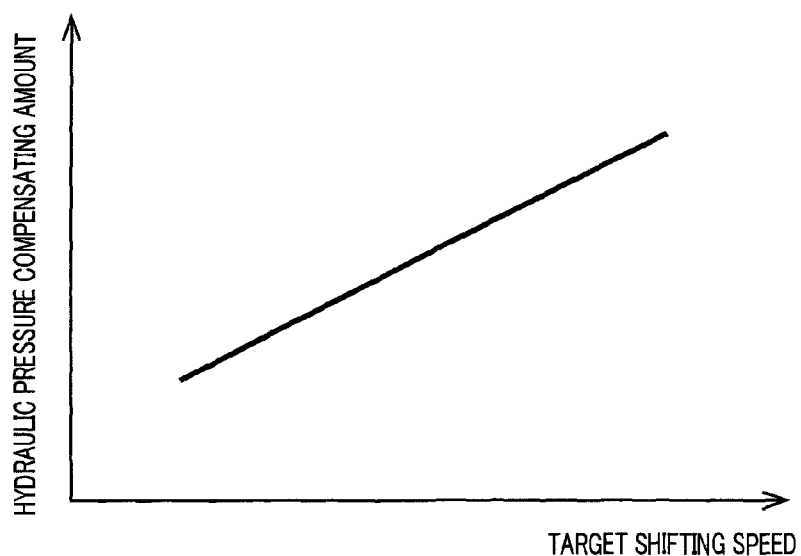
FIG. 9 is a view indicating a relationship between a compensating hydraulic pressure and the target shifting speed, which is predetermined to determine the above-indicated compensating hydraulic pressure on the basis of the above-indicated target shifting speed, in the compensation control of the commanded hydraulic pressure implemented by the electronic control device of FIG. 2.

At a point of time t1 in FIG. 7, the accelerator pedal operation amount Acc is rapidly increased. As a result, the shift determining means 102 determines that a shifting action to be performed under the control of the shift control means 104 is a rapid shift-down action. Accordingly, the shift control means 104 initiates a shifting control at the point of time t1, to perform the rapid-shift-down action. Namely, the shift-down action is initiated at the point of time t1 in the specific example of FIG. 7. From the point of time t1, the first supply hydraulic pressure Pin and the second supply hydraulic pressure Pout are changed so that the speed ratio $\gamma$ of the belt-type transmission 18 coincides with the transient target speed ratio value $\gamma^*$. Although the shift control means 104 is basically configured to determine the first-variable-diameter-pulley hold pressure Pin_n as the first-variable-diameter-pulley commanded hydraulic pressure value Pintgt, during the shift-down action, the first-variable-diameter-pulley commanded hydraulic pressure value Pintgt is temporarily made lower than the first-variable-diameter-pulley hold pressure Pin_n, upon initiation of the shift-down operation (at the point of time t1), as indicated by the broken line. Described more specifically, the shift control means 104 implements temporary reduction of the first-variable-diameter-pulley commanded hydraulic pressure value Pintgt, by reducing the first-variable-diameter-pulley commanded hydraulic pressure value Pintgt by a predetermined hydraulic pressure compensating amount Pintgtc with respect to the first-variable-diameter-pulley hold pressure Pin_n, at the point of time t1 and holding the compensated commanded hydraulic pressure value Pintgt for a predetermined commanded hydraulic pressure compensating time TIMEc, as indicated in FIG. 7. After the commanded hydraulic pressure compensating time TIMEc has expired, the shift control means 104 controls the first-variable-diameter-pulley commanded hydraulic pressure value Pintgt to coincide with the first-variable-diameter-pulley hold pressure Pin_n. As a result of the temporary reduction of the first-variable-diameter-pulley commanded hydraulic pressure value Pintgt upon initiation of the shift-down action, the first supply hydraulic pressure Pin (indicated by the solid line) is reduced immediately after the point of time t1, so that the first supply hydraulic pressure Pin follows the first-variable-diameter-pulley commanded hydraulic pressure value Pintgt (indicated by the broken line), with a higher degree of response. In the specific example of FIG. 7, the first-variable-diameter-pulley commanded hydraulic pressure value Pintgt is temporarily reduced by the compensating amount Pintgtc with respect to the first-variable-diameter-pulley hold pressure Pin_n at the point of time t1. However, the first-variable-diameter-pulley commanded hydraulic pressure value Pintgt may be reduced from time to time by the compensating amount Pintgtc with respect to the first-variable-diameter-pulley hold pressure Pin_n which is changed from time to time for the commanded hydraulic pressure compensating time TIMEc. This commanded hydraulic pressure compensating time TIMEc is an extremely short length of time, and the compensating time and compensating amount Pintgtc are parameters determined by experimentation so as to reduce the first supply hydraulic pressure Pin upon initiation of the shift-down action while preventing slipping of the transmission belt, and to improve the shifting response. While one or both of the above-indicated commanded hydraulic pressure compensating time TIMEc and hydraulic pressure compensating amount Pintgtc may be a constant value, the shift control means 104 according to the present embodiment is configured to increase the commanded hydraulic pressure compensating time TIMEc with an increase of the target shifting speed value $\Delta\gamma^*$, as indicated in FIG. 8, and to increase the hydraulic pressure compensating amount Pintgtc with an increase of the target shifting speed value $\Delta\gamma^*$, as indicated in FIG. 9. The target shifting speed value $\Delta\gamma^*$ used to determine the above-indicated commanded hydraulic pressure compensating time TIMEc and hydraulic pressure compensating amount Pintgtc may be the one at any point of time during the shifting action (shift-down action), for example at a point of time a predetermined time after the moment of initiation of the shifting action. In the present embodiment, however, a maximum value of the target shifting speed $\Delta\gamma^*$ during the shifting action is used.

FIG. 10 is the flow chart illustrating a major portion of a control operation of the electronic control device 80, namely, a control operation to control a rapid shift-down action of the belt-type transmission 18. The control operation is repeatedly performed with an extremely short cycle time of about several milliseconds to several tens of milliseconds.

Initially, step SA1 (hereinafter "step" being omitted) corresponding to the shift determining means 102 is implemented to determine whether a rapid shift-down action of the belt-type transmission 18 is required to be performed, that is, whether the shifting action to be performed or in the process of being performed is a rapid shift-down action. If an affirmative determination is obtained in SA1, that is, if the shifting action to be performed or in the process of being performed is a shift-down action, the control flow goes to SA2. If a negative determination is obtained in SA1, the control operation of the flow chart is terminated.

SA2 is implemented to determine whether a length of time which has elapsed after the moment of initiation of the rapid shift-down action is shorter than the above-indicated commanded hydraulic pressure compensating time TIMEc, that is, whether the commanded hydraulic pressure compensating time TIMEc has expired after the moment of initiation of the rapid shift-down action. If an affirmative determination is obtained in SA2, that is, if the length of time which has elapsed after the moment of initiation of the rapid shift-down action is shorter than the commanded hydraulic pressure compensating time TIMEc, the control flow goes to SA3. If a negative determination is obtained in SA2, the control flow goes to SA4.

SA3 is implemented to determine the second-variable-diameter-pulley commanded hydraulic pressure value Pouttgt to be a sum of the second-variable-diameter-pulley hold pressure Pout_n and the shifting differential pressure Pdf as, as indicated by the following formula (1), and determine the first-variable-diameter-pulley commanded hydraulic pressure value Pintgt to be the first-variable-diameter-pulley hold pressure Pin_n minus the above-indicated compensating amount Pintgtc, namely, obtains the first-variable-diameter-pulley commanded hydraulic pressure value Pintgt by subtracting the compensating amount Pintgtc from the first-variable-diameter-pulley hold pressure Pin_n, as indicated by the following formula (2). The rapid shift-down action of the belt-type transmission 18 is performed or continued on the basis of the determined first-variable-diameter-pulley commanded hydraulic pressure value Pintgt and second-variable-diameter-pulley commanded hydraulic pressure value Pouttgt.

$$Pout tgt = Pout\_n + Pdf \qquad (1)$$

$$Pin tgt = Pin\_n - Pin tgtc \qquad (2)$$

SA4 is implemented to determine the second-variable-diameter-pulley commanded hydraulic pressure value Pouttgt to be a sum of the second-variable-diameter-pulley hold pressure Pout_n and the shifting differential pressure Pdf as, as indicated by the above-indicated formula (1), and determine the first-variable-diameter-pulley commanded hydraulic pressure value Pintgt to be the first-variable-diameter-pulley hold pressure Pin_n, as indicated by the following formula (3). The rapid shift-down action of the belt-type transmission 18 is performed or continued on the basis of the determined first-variable-diameter-pulley commanded hydraulic pressure value Pintgt and second-variable-diameter-pulley commanded hydraulic pressure value Pouttgt. It will be understood that SA2-SA4 correspond to the shift control means 104.

$$Pin tgt = Pin\_n \qquad (3)$$

The present embodiment is configured such that the shift control means 104 implements the above-described commanded hydraulic pressure compensating control to temporarily reduce the first-variable-diameter-pulley commanded hydraulic pressure value Pintgt with respect to the first-variable-diameter-pulley hold pressure Pin_n, in the initial period of the shift-down action, when the first-variable-diameter-pulley hold pressure Pin_n is determined as the first-variable-diameter-pulley commanded hydraulic pressure value Pintgt to perform the shift-down action. The temporary reduction of the first-variable-diameter-pulley commanded hydraulic pressure value Pintgt makes it possible to reduce the hydraulic pressure to be received by the hydraulic cylinder 42c of the first variable-diameter pulley 42, namely, the first supply hydraulic pressure Pin, immediately after the moment of initiation of the shift-down action, as compared with that before the moment of initiation, as indicated in the time chart of FIG. 7. Accordingly, the working oil can be easily discharged from the hydraulic cylinder 42c of the first variable-diameter pulley 42, permitting a sufficiently high degree of shifting response of the belt-type transmission 18, with efficient response in decrease and increase of the effective diameters of the respective first and second variable-diameter pulleys 42 and 46 in a shift-down action, for instance, a rapid shift-down action of the belt-type transmission 18. In addition, the hydraulic pressure within the hydraulic cylinder 42c of the first variable-diameter pulley 42 is not considerably reduced due to oil flow resistances of the orifice 290 and oil passage 292 in the hydraulic control circuit 150 or the like, since the first-variable-diameter-pulley commanded hydraulic pressure value Pintgt is reduced only temporarily in the initial period of the shift-down action. Accordingly, it is possible to adequately prevent slipping of the transmission belt.

The present embodiment is further configured such that the orifice 290 is provided in the oil passage 292 between the hydraulic cylinder 42c of the first variable-diameter pulley 42 and the first hydraulic pressure control valve 251. The orifice 290 functions to prevent a change of the hydraulic pressure within the hydraulic cylinder 42c of the first variable-diameter pulley 42, so that slipping of the transmission belt can be more effectively prevented, than in the case where the orifice 290 is not provided.

The present embodiment is also configured such that the shift control means 104 temporarily reduces the first-variable-diameter-pulley commanded hydraulic pressure value Pintgt with respect to the first-variable-diameter-pulley hold pressure Pin_n in the initial period of the shift-down action, namely, implements the above-described commanded hydraulic pressure compensating control, such that the above-described compensating amount Pintgtc which is an amount of reduction of the first-variable-diameter-pulley commanded hydraulic pressure value Pintgt with respect to the first-variable-diameter-pulley hold pressure Pin_n increases with an increase of the target shifting speed value $\Delta\gamma^*$ during the shift-down action, as indicated in FIG. 9. Accordingly, the amount of reduction of the first supply hydraulic pressure Pin immediately after the moment of initiation of the above-indicated shift-down action also increases with the increase of the target shifting speed value $\Delta\gamma^*$, so that the shifting response can be changed according to the target shifting speed value $\Delta\gamma^*$.

The present embodiment is further configured such that the shift control means 104 temporarily reduces the first-variable-diameter pulley commanded hydraulic pressure value Pintgt with respect to the first-variable-diameter-pulley hold pressure Pin_n in the initial period of the shift-down action, namely, implements the above-described commanded hydraulic pressure compensating control, such that the above-described commanded hydraulic pressure compensating time TIMEc during which the first-variable-diameter-pulley commanded hydraulic pressure value Pintgt is temporarily reduced with respect to the first-variable-diameter-pulley hold pressure Pin_n increases with an increase of the target shifting speed value $\Delta\gamma^*$ during the shift-down action, as indicated in FIG. 8. Accordingly, the amount of reduction of the first supply hydraulic pressure Pin immediately after the moment of initiation of the above-described shift-down action also increases with the increase of the above-indicated target shifting speed value $\Delta\gamma^*$, so that the shifting response can be changed according to the target shifting speed value $\Delta\gamma^*$.

The present embodiment is also configured such that the shift control means 104 determines a sum of the second-variable-diameter-pulley hold pressure Pout_n and the shifting differential pressure Pdf as the second-variable-diameter-pulley commanded hydraulic pressure value Pouttgt, to perform the shift-down action in which the first-variable-diameter-pulley hold pressure Pin_n is determined as the first-variable-diameter-pulley commanded hydraulic pressure value Pintgt, namely, to perform the above-described rapid shift-down action. Accordingly, it is possible to more effectively prevent slipping of the transmission belt, than in the case of the shift-down action wherein the second-variable-diameter-pulley commanded hydraulic pressure value Pouttgt is held at the second-variable-diameter-pulley hold pressure Pout_n, while the first-variable-diameter-pulley commanded hydraulic pressure value Pintgt is reduced with respect to the first-variable-diameter-pulley hold pressure Pin_n.

The present embodiment is further configured such that the shift control means 104 holds the first-variable-diameter-pulley commanded hydraulic pressure value Pintgt at the first-variable-diameter-pulley hold pressure Pin_n after the above-described commanded hydraulic pressure compensating control is implemented to temporarily reduce the first-variable-diameter-pulley commanded hydraulic pressure value Pintgt with respect to the first-variable-diameter-pulley hold pressure Pin_n in the initial period of the above-described shift-down action, that is, after the commanded hydraulic pressure compensating time TIMEc has elapsed after the moment of initiation of the shift-down action, as illustrated in the flow chart of FIG. 10. Accordingly, the hydraulic pressure control after the first-variable-diameter-pulley commanded hydraulic pressure value Pintgt is held at the first-variable-diameter-pulley hold pressure Pin_n can be implemented in the same manner as the hydraulic pressure control in which the first-variable-diameter-pulley commanded hydraulic pressure value Pintgt is not temporarily reduced.

While the embodiment of this invention has been described in detail by reference to the drawings, for illustrative purpose only, it is to be understood that the present invention may be embodied with various change and improvements, which may occur to those skilled in the art.

In the embodiment described above, the vehicular drive system 10 shown in FIG. 1 is provided with only the engine 12 as the vehicle drive power source. However, the vehicular drive system 10 may be replaced by a drive system for a hybrid vehicle, which is provided with an electric motor or electric motors in addition to the engine 12, or a drive system for an electric vehicle, which is provided with an electric motor or electric motors in place of the engine 12.

While the control operation to compensate the above-indicated commanded hydraulic pressure is performed upon initiation of the above-indicated rapid shift-down operation, in the illustrated embodiment, the control operation may be performed for all shift-down actions.

In the hydraulic control circuit of FIG. 3 according to the illustrated embodiment, the orifice 290 is provided at an hydraulic pressure inlet of the hydraulic cylinder 42c of the first variable-diameter pulley 42, to prevent rapid reduction of the hydraulic pressure within the hydraulic cylinder 42c. However, the orifice 290 need not be provided, if the oil passage 292 has an oil flow resistance high enough to prevent the rapid reduction of the hydraulic pressure within the hydraulic cylinder 42c.

Although the target shifting speed value $\Delta\gamma^*$ is taken along the horizontal axis of FIGS. 8 and 9 in the illustrated embodiment, the target shifting speed value Δγ* may be replaced by a speed ration difference, which is a difference (=γ1*−γ) between the final target speed ratio value γ1* and the initial speed ratio γ. Namely, the commanded hydraulic pressure compensating time TIMEc may be increased with an increase of the above-indicated speed ratio difference, and the hydraulic pressure compensating amount Pintgtc may be increased with an increase of the above-indicated speed ratio difference.

In the illustrated embodiment, the shift determining means 102 is configured to determine the final target speed ratio value γ1* on the basis of the vehicle speed V and the accelerator pedal operation amount Acc. However, the final target speed ratio value γ1* may be determined by any parameters indicative of the vehicle running state, other than the vehicle speed V and accelerator pedal operation amount Acc.

It is to be understood that various other changes not illustrated herein may be made in the present invention, without departing from the spirit of the invention.

NOMENCLATURE OF REFERENCE SIGNS

10: Vehicular drive system (Vehicular shift control apparatus)
18: Belt-type transmission
42: First variable-diameter pulley
42c: Hydraulic cylinder
46: Second variable-diameter pulley
46c: Hydraulic cylinder
48: Transmission belt
80: Electronic control device (Vehicular shift control apparatus)
251: First hydraulic pressure control valve (Hydraulic pressure control valve)
290: Orifice

The invention claimed is:

1. A vehicular shift control apparatus configured to control a speed ratio of a belt-type transmission having a first variable-diameter pulley disposed on the side of a drive power source of a vehicle, a second variable-diameter pulley disposed on the side of drive wheels of the vehicle, and a transmission belt wound between the first and second variable-diameter pulleys, by controlling hydraulic pressures to be applied to respective hydraulic cylinders of said first and second variable-diameter pulleys, according to respective commanded hydraulic pressure values of the first and second variable-diameter pulleys, such that the speed ratio coincides with a target value, the vehicular shift control apparatus comprising:
a shift control portion configured to be operable, when a first-variable-diameter-pulley hold pressure which permits the speed ratio of said belt-type transmission to be held at the target value in a shift-down action of said belt-type transmission is determined as said commanded hydraulic pressure value of the first variable-diameter pulley, to temporarily reduce said commanded hydraulic pressure value with respect to said first-variable-diameter-pulley hold pressure in an initial period of said shift-down action,
wherein said shift control portion is configured to be operable to temporarily reduce said commanded hydraulic pressure value of the first variable-diameter pulley with respect to said first-variable-diameter-pulley hold pressure in the initial period of said shift-down action, such that an amount of reduction of said commanded hydraulic pressure value of the first variable-diameter pulley with respect to said first-variable-diameter-pulley hold pressure increases with an increase of a target value of a shifting speed which is a rate of change of said speed ratio.

2. A vehicular shift control apparatus configured to control a speed ratio of a belt-type transmission having a first variable-diameter pulley disposed on the side of a drive power source of a vehicle, a second variable-diameter pulley disposed on the side of drive wheels of the vehicle, and a transmission belt wound between the first and second variable-diameter pulleys, by controlling hydraulic pressures to be applied to respective hydraulic cylinders of said first and second variable-diameter pulleys, according to respective commanded hydraulic pressure values of the first and second variable-diameter pulleys, such that the speed ratio coincides with a target value, the vehicular shift control apparatus comprising:
a shift control portion configured to be operable, when a first-variable-diameter-pulley hold pressure which permits the speed ratio of said belt-type transmission to be held at the target value in a shift-down action of said belt-type transmission is determined as said commanded hydraulic pressure value of the first variable-diameter pulley, to temporarily reduce said commanded hydraulic pressure value with respect to said first-variable-diameter-pulley hold pressure in an initial period of said shift-down action,
wherein said shift control portion is configured to be operable to temporarily reduce said commanded hydraulic pressure value of the first variable-diameter pulley with respect to said first-variable-diameter-pulley hold pressure in the initial period of said shift-down action, such that a length of time during which said commanded hydraulic pressure value of the first variable-diameter pulley is temporarily reduced with respect to said first-variable-diameter-pulley hold pressure increases with an increase of a target value of a shifting speed which is a rate of change of said speed ratio.

3. A vehicular shift control apparatus configured to control a speed ratio of a belt-type transmission having a first variable-diameter pulley disposed on the side of a drive power source of a vehicle, a second variable-diameter pulley disposed on the side of drive wheels of the vehicle, and a transmission belt wound between the first and second variable-diameter pulleys, by controlling hydraulic pressures to be applied to respective hydraulic cylinders of said first and second variable-diameter pulleys, according to respective commanded hydraulic pressure values of the first and second variable-diameter pulleys, such that the speed ratio coincides with a target value, the vehicular shift control apparatus comprising:
a shift control portion configured to be operable, when a first-variable-diameter-pulley hold pressure which permits the speed ratio of said belt-type transmission to be held at the target value in a shift-down action of said belt-type transmission is determined as said commanded hydraulic pressure value of the first variable-diameter pulley, to temporarily reduce said commanded hydraulic pressure value with respect to said first-variable-diameter-pulley hold pressure in an initial period of said shift-down action,
wherein said shift control portion is configured to be operable to determine a sum of a second-variable-diameter-pulley hold pressure which permits the speed ratio to be held at said target value in said shift-down action, and a shifting differential pressure for establishing a target value of a shifting speed in the shift-down action, as said commanded hydraulic pressure value of the second variable-diameter pulley, said shifting speed being a rate of change of said speed ratio.

4. The vehicular shift control apparatus according to claim 1, wherein an orifice is provided in an oil passage between the hydraulic cylinder of said first variable-diameter pulley and a hydraulic pressure control valve configured to regulate a hydraulic pressure to be applied to the hydraulic cylinder of said first variable-diameter pulley.

5. The vehicular shift control apparatus according to claim 2, wherein an orifice is provided in an oil passage between the hydraulic cylinder of said first variable-diameter pulley and a hydraulic pressure control valve configured to regulate a hydraulic pressure to be applied to the hydraulic cylinder of said first variable-diameter pulley.

6. The vehicular shift control apparatus according to claim 3, wherein an orifice is provided in an oil passage between the hydraulic cylinder of said first variable-diameter pulley and a hydraulic pressure control valve configured to regulate a hydraulic pressure to be applied to the hydraulic cylinder of said first variable-diameter pulley.

7. The vehicular shift control apparatus according to claim 1, wherein said shift control portion holds said commanded hydraulic pressure value of the first variable-diameter pulley at said first-variable-diameter-pulley hold pressure after the commanded hydraulic pressure value of the first variable-diameter pulley is temporarily reduced with respect to the first-variable-diameter-pulley hold pressure in the initial period of said shift-down action.

8. The vehicular shift control apparatus according to claim 2, wherein said shift control portion holds said commanded hydraulic pressure value of the first variable-diameter pulley at said first-variable-diameter-pulley hold pressure after the commanded hydraulic pressure value of the first variable-diameter pulley is temporarily reduced with respect to the first-variable-diameter-pulley hold pressure in the initial period of said shift-down action.

9. The vehicular shift control apparatus according to claim 3, wherein said shift control portion holds said commanded hydraulic pressure value of the first variable-diameter pulley at said first-variable-diameter-pulley hold pressure after the commanded hydraulic pressure value of the first variable-diameter pulley is temporarily reduced with respect to the first-variable-diameter-pulley hold pressure in the initial period of said shift-down action.

* * * * *